US008790050B2

(12) United States Patent
Marguet et al.

(10) Patent No.: US 8,790,050 B2
(45) Date of Patent: Jul. 29, 2014

(54) DRILLING SYSTEM AND METHOD

(75) Inventors: Benoit Marguet, Saint Loup Cammas (FR); Olivier Lebahar, Fontenilles (FR); Eric Le Gouriellec, Saint Brevin les Pins (FR); Eric Larousse, Fonsorbes (FR); Jean-Marc Leray, Trignac (FR)

(73) Assignee: Airbus Operations S.A.S., Toulouse (FR)

( * ) Notice: Subject to any disclaimer, the term of this patent is extended or adjusted under 35 U.S.C. 154(b) by 653 days.

(21) Appl. No.: 13/057,517

(22) PCT Filed: Aug. 10, 2009

(86) PCT No.: PCT/FR2009/051577
§ 371 (c)(1),
(2), (4) Date: Jun. 21, 2011

(87) PCT Pub. No.: WO2010/018340
PCT Pub. Date: Feb. 18, 2010

(65) Prior Publication Data
US 2011/0243676 A1   Oct. 6, 2011

(30) Foreign Application Priority Data
Aug. 12, 2008 (FR) ...................................... 08 55544

(51) Int. Cl.
*B23B 39/00* (2006.01)
(52) U.S. Cl.
CPC ....................................... *B23B 39/00* (2013.01)
USPC ............................ 408/19; 408/1 R; 408/234
(58) Field of Classification Search
USPC .............. 408/19, 1 R, 13, 79, 95, 97, 98, 234
See application file for complete search history.

(56) References Cited

U.S. PATENT DOCUMENTS

| 5,395,187 | A | * | 3/1995 | Slesinski et al. | 408/1 R |
| 5,468,099 | A | * | 11/1995 | Wheetley et al. | 408/1 R |
| 5,628,592 | A | * | 5/1997 | Ringer | 408/97 |
| 6,011,482 | A |  | 1/2000 | Banks et al. |  |
| 6,012,877 | A | * | 1/2000 | McCowin et al. | 408/1 R |
| 6,926,094 | B2 | * | 8/2005 | Arntson et al. | 173/32 |
| 7,611,314 | B2 | * | 11/2009 | Lipczynski et al. | 409/200 |

FOREIGN PATENT DOCUMENTS

| EP | 0 761 351 A1 | 3/1997 |
| EP | 1 563 950 A1 | 8/2005 |
| EP | 1918067 A2 * | 5/2008 |
| FR | 2809034 A1 * | 11/2001 |

OTHER PUBLICATIONS

International Search Report issued Feb. 9, 2010 in Application No. PCT/FR2009/051577.

* cited by examiner

*Primary Examiner* — Andrea Wellington
*Assistant Examiner* — Alan Snyder
(74) *Attorney, Agent, or Firm* — Oblon, Spivak, McClelland, Maier & Neustadt, L.L.P.

(57) ABSTRACT

A drilling system is formed as a support structure to be mounted on a surface to be drilled, a beam supported by the support structure, a tool holder supported by the beam and having a locking orifice, and a drilling tool mounted on the tool holder by sliding connection in the direction parallel to the drilling axis. The drilling tool includes a bearing mandrel and an expandable ring closely fitting the bearing mandrel along a tapered contact surface for expanding the ring to ensure its locking in the locking orifice. Relative movement between the ring locked in the locking orifice and the bearing mandrel procures, by movement of the drilling tool relative to the tool holder via the slide connection, a movement of the bearing mandrel towards the surface to be drilled, through the locking orifice.

9 Claims, 7 Drawing Sheets

DRILLING SYSTEM AND METHOD

TECHNICAL FIELD

The present invention generally relates to the field of drilling systems, intended to be mounted on a surface to be drilled with any shape and orientation whatsoever. The invention also relates to a drilling method.

The invention preferably but not exclusively applies to drilling for the assembly of two component assemblies of an aircraft fuselage. More specifically, it can involve a drilling system adapted to proceed with drilling operations for a so-called seaming assembly, i.e. assembly by placing fastening members to be crimped of the lockbolt or rivet type, along an interface shared by the two assemblies, called an overlap area or junction area.

For information, a distinction is generally made between so-called orbital seams adapted to the assembly of two assemblies, in this case called "segments," with an approximately cylindrical shape, and so-called longitudinal seams corresponding to the assembly of two essentially half-cylinder shaped assemblies. The longitudinal seams are formed along generatrices of the running section, whereas the orbital seams are made in an interface area between two transverse sections of the fuselage, these two types of seams being able to be formed along non-linear longitudinal generatrices and along non-circular transverse generatrices, respectively, when these assemblies are done on fuselage portions situated at the front tip or back end of the aircraft, where the shape of the fuselage has a double curve.

The drilling system according to the invention can be used to join an overlap area having a single curve or a double curve. For information, the single-curve panels are called "developable," and have a rectilinear generatrix implying that they can be "unwound" on a plane. On the other hand, the double-curve panels, such as the fuselage panels of an aircraft cockpit, are not "developable" and therefore do not have a rectilinear generatrix, i.e. they cannot be "unwound" in a plane. In fact, they have a first curve, for example in the longitudinal direction of the panel, as well as a second curve separate from the first, for example in the transverse direction of this same panel.

BACKGROUND OF THE INVENTION

Drilling systems are typically used to perform repetitive operations on the surface of assemblies with any shape and orientation, in particular aircraft fuselage assemblies.

Thus, American patent U.S. Pat. No. 5,468,099 describes a drilling system mounted on an self-contained mobile capable of moving on the curved surface of fuselage panels to be assembled. The self-contained mobile is used to assemble two panels, in particular to an internal structural beam of the aircraft. More specifically, the panels are arranged so as to substantially form a junction line between two respective ends of the panels, without there being any overlap. The self-contained mobile moves by creeping along the junction line and performs drilling operations for drilling fastening orifices. Then, the panels are fastened by riveting to the beam through the fastening orifices made.

However, several difficulties concerning the drilling appear when one seeks to assemble two panels, no longer through a beam, but directly to each other by an overlap area. Indeed, the relative mounting interference tolerances of the fastening members are very tight, in general a few hundredths of a millimeter only, such that it is extremely difficult to pre-drill the panels intended to form the overlap area of the two assemblies, while also ensuring the coaxiality of each of the holes in the interference tolerance. Consequently, the panels are generally arranged such that they are drilled during the same drilling operation, in order to obtain, during that same operation, a single orifice for housing the fastening member, formed by the two holes respectively obtained through the two at least partially superimposed panels.

The difficulty then lies in the fact that the assembly interface must in particular be free from any fins and any shavings for fear of reducing the fatigue behavior characteristics of the fuselage thus assembled. Moreover, to ensure the sealing of the interface between the assemblies, essential to the maintenance of the pressurization of the fuselage in flight, it is trimmed with a fine layer of a sealant, or interposition cement. Moreover, in order to ensure the mechanical transmission continuity of stresses in the fuselage, it is made such that the contact between the two assemblies at each fastening member is a metal-metal contact, i.e. there is no coupling of stresses through the interposition cement.

However, the drilling system of the self-contained mobile according to the prior art is equipped with a drilling tool that is not provided to avoid the formation of fins, or to make an assembly with metal-metal contact, at the interface between the two panels.

Thus, to ensure these different conditions, it is then necessary to
- disassemble the two assemblies in order to perform cleaning and deburring of the panels at the fastening orifices;
- apply the interposition cement on the panels of the assemblies intended to form the overlap area;
- bring the two assemblies into position, to again bring these two assemblies into the determined relative position making it possible to put the fastening members in place, the two assemblies thus positioned jointly forming the overlap area having a layer of interposition cement between the two panels of said area.

Thus, the inability of the drilling system according to the prior art to prevent the formation of fins, and to perform an assembly with metal-metal contact, at the interface between the two panels, requires the performance of disassembly/bursting and reassembly operations of the assemblies, as well as cleaning/deburring operations of the latter, which considerably lengthens the manufacturing cycle, making it expensive and not optimized.

To avoid the appearance of such fins at the overlap/junction area between the two panels having to be drilled during the same operation, one solution known from the prior art consists of applying a determined tightening force between these two panels. More precisely, the desired pressure is such that it makes it possible to generate a stress on the overlap area that prevents the appearance of fins on one hand, and the insertion of shavings at the interface of the assembled panels on the other hand, coated with interposition cement.

However, the means generally used to produce this pressure are complex and difficult to implement on the assemblies to be secured by seaming. Moreover, these pressurizing means make the intervention of a drilling system difficult, if not impossible, for bulk reasons.

BRIEF DESCRIPTION OF THE INVENTION

The aim of the present invention is to resolve at least some of the aforementioned drawbacks, and in particular to propose a drilling system making it possible to apply the required pressure simply on a surface to be drilled during the drilling of holes through that same surface, in order to prevent the appearance of fins, on one hand, and the insertion of shavings at the interface of the assembled panels, usually coated with interposition cement, on the other hand.

To that end, the invention relates to a drilling system comprising:
- a support structure, intended to be mounted on a surface to be drilled,
- a beam supported by the support structure,
- a tool holder supported by said beam, and
- a drilling tool mounted on said tool holder.

According to the invention, said drilling tool is mounted on said tool holder by sliding connection in the direction parallel to the drilling axis defined by said tool, said tool holder having a locking orifice, said drilling tool including a bearing mandrel intended to come into contact against the surface to be drilled as well as an expandable ring closely fitting the mandrel along a tapered contact surface and adapted so that a relative movement along a tapered contact surface central axis between the mandrel and the ring procures an expansion of said ring capable of ensuring its locking in the locking orifice, said drilling system being designed so that the relative movement between the ring locked in the locking orifice and the bearing mandrel procures, by movement of the drilling tool relative to the tool holder via the slide connection, a movement of the mandrel towards the surface to be drilled, through the locking orifice.

Thus, the invention in fact provides a simple and clever solution making it possible to easily apply the necessary pressure on a surface to be drilled, for example an overlap area of aircraft fuselage panels, during drilling of holes through said same surface, in order to prevent the appearance of fins, on one hand, and the insertion of shavings at the interface of the assembled panels, generally coated with interposition cement, on the other hand.

Indeed, the drilling tool used can be of the type traditionally known by those skilled in the art, like that manufactured by the company Cooper Power Tools and designated "P2 Drill with Concentric Collet Foot." This type of drilling tool is also described in document EP 0 761 351 A, which is included herein by reference.

It should be noted that the drilling tools like those indicated above are used in cooperation with an orifice for centering a drilling grid fixedly mounted on an overlap area. The presence of the bearing mandrel and its associated expandable ring is then motivated by the sole need to lock said tool in rotation and translation in the centering orifice, by friction between the ring and that same centering orifice. To that end, the ring is put in motion along the central tapered contact surface axis between the latter part and the mandrel, through the corresponding centering orifice and in a direction opposite the overlap area against which the mandrel, immobile relative to the centering orifice, remains bearing. This movement is stopped when the expansion of the ring in the orifice of the grid is sufficient to lock the tool in rotation and translation relative to said grid.

On the other hand, unlike the prior art, the drilling tool according to the invention does not cooperate with an orifice for centering a drilling grid fastened to the overlap area, but with an orifice for locking the tool holder, the latter being supported by a support structure, itself mounted on the surface to be drilled. The cooperation between the drilling tool and the locking orifice is allowed by the fact that the drilling tool is mounted by slide connection on the tool holder.

Thus, the drilling system is designed so that the relative movement applied between the ring and the mandrel translates essentially to a movement of the mandrel in the direction of the overlap area, and not by a movement of the ring in the direction opposite that of the overlap area, even if the latter movement can be observed until obtainment of a true locking of the ring in the orifice for locking the tool holder.

The drilling system according to the invention thereby makes it possible to avoid using a drill grid to be fastened on the overlap area.

In that respect, the tool holder preferably comprises a first portion, substantially parallel to the drilling axis, mounted on the beam and supporting the drilling tool, and a second portion substantially orthogonal to the drilling axis and including said locking orifice. The locking orifice is adapted to receive the expandable ring of the drilling tool in a through manner, in part or in whole. It should be noted that the drilling axis and the tapered contact surface central axis are preferably identical. Moreover, the axis of symmetry of the locking orifice is advantageously identical to the drilling axis.

Preferably, the drilling tool includes a drilling tool body integral with said mandrel, and also includes a jack having a cylinder integral with said tool body and the piston of which is connected to the expandable ring. Thus, actuating the jack makes it possible to set the mandrel in relative motion secured to the tool body and the expandable ring.

Preferably, said tool holder is mounted slidingly on said beam along the drilling axis, which makes it possible, during drilling steps, to bring the bearing mandrel of the drilling tool into contact with the surface to be drilled, and in the other situations, to distance the drilling tool from said surface to avoid any involuntary contact, as a protective measure.

Advantageously, said beam is slidingly mounted on the support structure along a first axis substantially perpendicular to the drilling axis. Thus, for a given position of the support structure relative to the surface, the beam can slide relative to the support structure, allowing the drilling system to perform a plurality of drilling steps along the overlap area. It should be noted that the first axis is preferably curved in the case where the support structure has a given curvature along the first axis.

In a second embodiment of the invention, the drilling system includes:
- at least two advancement assemblies, each mounted slidingly to said beam along an elevation direction substantially parallel to the drilling axis,
- said support structure and said advancement assemblies each supporting hooking members adapted to adhere on said surface to be drilled, and
- a control member controlling the relative movement of the advancement assemblies relative to the beam and the relative movement of the beam relative to the support structure.

Thus, by orderly repetition of relative movements between the advancement assemblies and the beam, on one hand, and between the beam and the support structure on the other hand, the drilling system is capable of moving by creeping, independently, along the overlap area in a given direction. The drilling system according to the second embodiment is then a self-contained mobile drilling system, making it possible to perform drilling operations in a completely automated manner over several working areas of a surface to be drilled. Moreover, several self-contained mobile drilling systems can operate at the same time in different locations of the surface to be drilled, thereby procuring a high productivity increase.

Preferably, the beam comprises two sliding members each being fastened to one end of said beam and connected by slide connection to the support structure, each sliding member being equipped with a motor member ensuring the sliding of said sliding member on the support structure. The drilling system then comprises at least one sensor for detecting an orientation of the support structure relative to a desired movement line, and a control unit for controlling said first and second motor members of said beam so as to bring the support structure back to a determined position relative to the desired movement line.

A second aspect of the invention relates to a drilling method carried out using the drilling system described above, in which, for each step of drilling a hole, a relative movement is applied between the expandable ring and the bearing mandrel.

Thus, each step for drilling a hole through the surface to be drilled comprising a first operation for pressurizing said surface followed by a drilling operation, the application of a relative movement between the ring and the mandrel indeed makes it possible to perform the operation for pressurizing said surface. The method according to the invention makes it possible to prevent, during each drilling step, on one hand the appearance of fins, and on the other hand the insertion of shavings at the interface of the assembled panels, generally coated with interposition cement.

The application of said relative movement between the expandable ring and the bearing mandrel is preferably done so as to create a movement of the bearing mandrel against said surface to be drilled and through said locking orifice, over a distance (x2) respecting the condition (x2)>0.90.(x), where (x) corresponds to a total distance of the relative movement applied between the ring and the mandrel.

The aforementioned relationship indeed translates the desire to essentially obtain a movement of the mandrel through the locking orifice rather than a movement of the ring through that same locking orifice in the opposite direction. One skilled in the art will naturally be able to adapt the design of the different elements in question to arrive at such an operation, in particular by suitably dimensioning the nominal diameter of the expandable ring and that of the locking orifice. In that respect, it should be noted that a small initial play between the ring and the corresponding locking orifice, e.g. less than 0.5 mm, and preferably around 0.3 mm, is required to obtain locking of the ring in that same drilling orifice extremely quickly after the beginning of the application of the relative movement, said play nevertheless being sufficient to ensure an easy introduction of the expandable ring in the locking orifice before drilling. To that end, it has been observed that the application of tolerances H7 to H10 for the locking orifice of the tool holder, but preferably H7, could prove effective to obtain the effect desired above.

Preferably, the application of said relative movement between the expandable ring and the bearing mandrel is done so as to create, at the end of application, a bearing mandrel pressure, on said surface to be drilled, between about 600 and 1200 N. As will be described below, the design of the particular means used to produce such pressure makes it possible to determine the pressure beforehand that will be exerted during the application of the relative movement, as a function of different known parameters.

Whatever the case may be, this pressure value is therefore completely suitable for preventing the appearance of fins, on one hand, and the insertion of shavings at the interface of the assembled panels, generally coated with interposition cement, on the other hand. As a result, it is then advantageously possible to perform all of the drilling of orifices over the overlap/junction area during a same drilling step, without having to disassemble/reassemble the assemblies previously brought into position, in the reference of the aircraft when it involves fuselage assemblies.

Such a method in which all of the drill holes are made, possibly followed by the placement and crimping assembly of the fastening members, has the advantage of being very flexible in terms of labor. Indeed, a drilling system alone can perform all of the steps necessary to obtain the seaming, because at no time is it necessary to access both sides of the fuselage at the same time, whether for the installation of the tools, drilling-countersinking, or disassembly of the tools.

On the other hand, this type of method according to the invention also makes it possible to have several drilling systems and/or operators intervene both outside and inside the fuselage, so as to reduce the time needed to perform seaming. Because of this, it is noteworthy that the method according to the second aspect of the invention offers great flexibility in terms of organization of the work for a same seaming as a function of the required production rhythms, unlike, for example, the so-called "explosion" methods of the prior art, due to the grouping point related to this same explosion/disassembly of the two assemblies after drilling.

The method according to the invention therefore proposes a simple solution making it possible to avoid installing pressurizing means for pressurizing the overlap area, given that the pressurization is done during the drilling step by the drilling system according to the invention. The production cycle is therefore greatly optimized. Moreover, it clearly appears that the adopted solution does not present any drawbacks in terms of bulk, unlike what was encountered in the prior art, given that the pressurizing means are formed by the drilling system itself.

Moreover, this clever manner of performing the pressurization during the drilling of the holes easily allows the production of seams over overlap areas with complex shapes, such as overlap areas with a double curve, or over assemblies forming so-called "closed" structures, given that access to only a single side of the structure proves necessary for the placement of the drilling system generating the required pressure.

Other advantages and features of the invention will appear in the non-limiting detailed description below.

BRIEF DESCRIPTION OF THE DRAWINGS

We will now describe, as non-limiting examples, one preferred embodiment of the invention, in reference to the appended drawings, in which.

DETAILED DESCRIPTION OF SPECIFIC EMBODIMENTS

The drilling system according to the invention is intended to be mounted on a surface to be drilled, said surface being able to be of any shape and orientation whatsoever. In the rest of the description, we will describe embodiments of the invention applied to the assembly of two assemblies by seaming, constituting two transverse segments of the fuselage of an aircraft. The surface to be drilled then corresponds to an overlap area of two panels belonging to those two assemblies, as will be described later. It should be noted that this example of an application of the invention is in no way limiting, and other uses can indeed be considered.

Figure 1:
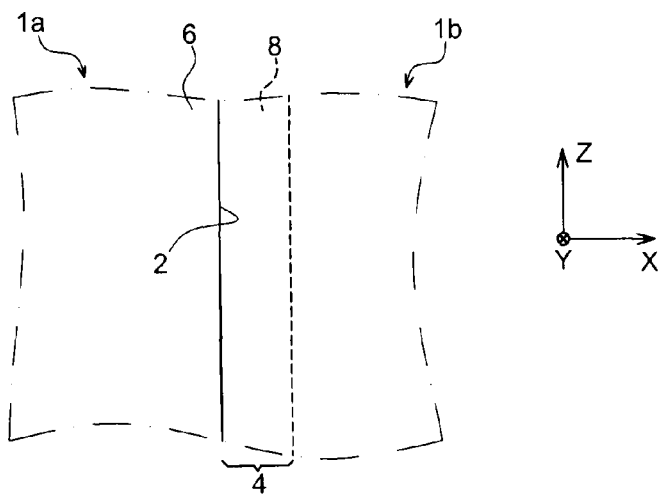
FIG. 1 is a top view of two assemblies to be assembled.

In reference first to FIG. 1, two assemblies 1a, 1b are visible intended to be assembled by so-called orbital seaming, using rivets, the drilling operations of which are done by the drilling system according to one embodiment of the present invention. This involves two assemblies 1a, 1b respectively constituting two transverse segments of the fuselage of an aircraft.

In this example of an application of the invention, the two assemblies 1a, 1b are in a determined relative position in a direct reference X, Y, Z, where direction X is parallel to the circumferential axis of the fuselage, therefore substantially tangent to the surface of the panels. Direction Y substantially corresponds to the longitudinal axis of the fuselage and direction Z is substantially perpendicular to the surface of the panels. The relative positioning is such that an overlap area 4 is formed, also called junction area, formed by two panels 6, 8 at least partially superimposed and belonging to the two assemblies 1a, 1b, respectively. Of course, the junction area 4 is intended to receive the orbital seaming of the rivets, as will be explained below. For that reason, following the putting into position of the two assemblies 1a, 1b, the overlap area obtained, in which a layer of interposition cement is located between the two panels 6, 8, is in the suitable configuration for drilling holes intended to house the various rivets of the seam. For information, it is preferably provided that the interposition cement or sealant is placed on each of the two panels 6, 8 before putting the two assemblies 1a, 1b into position.

The drilling system according to one embodiment of the invention will now be described in detail, in reference to FIGS. 2 to 9.

Figure 2:
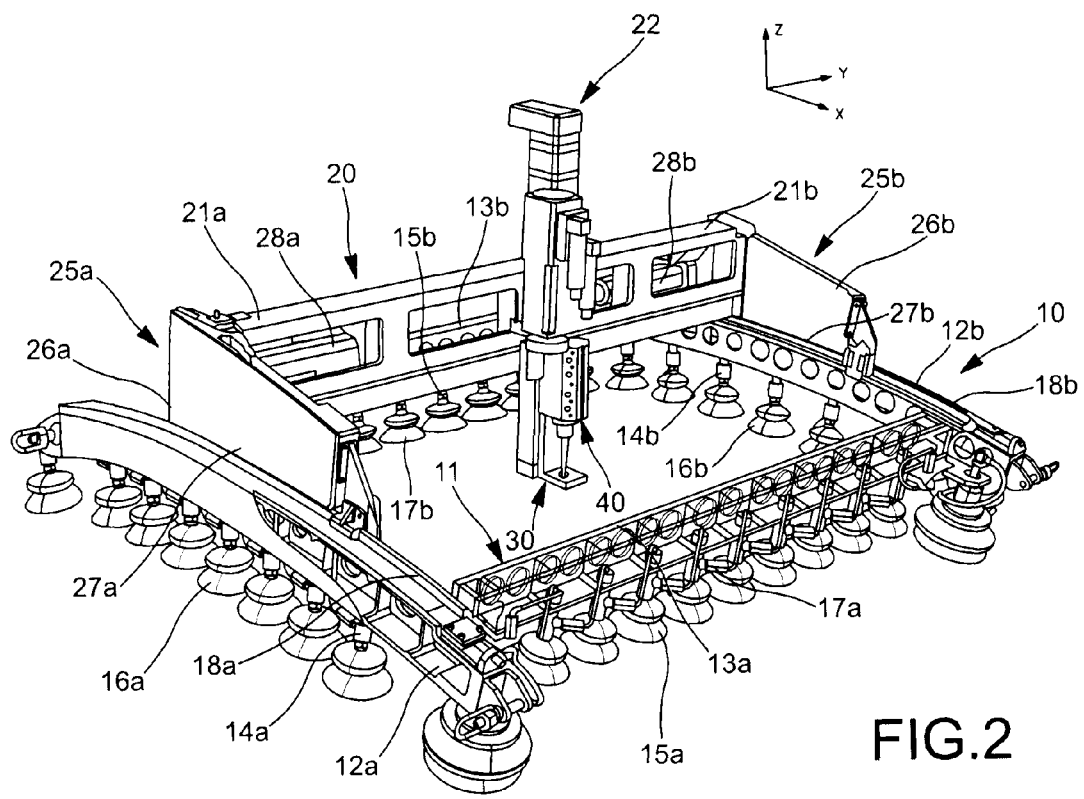
FIG. 2 is a perspective view of the drilling system according to one embodiment of the invention.

FIG. 2 shows a drilling system according to an embodiment mounted on the two panels 6, 8, preferably on the outer side of the panels.

It comprises a support structure 10 equipped, preferably, with adhering members making it possible to adhere to the panels 6, 8. A beam 20, substantially rectilinear and extending in direction Y, is supported by the support structure 10. A tool holder 30 is mounted on the beam 20 and has a locking orifice 31. A drilling tool 40 is mounted on the tool holder 30 and oriented so as to perform drilling operations substantially along direction Z, also called drilling axis.

Figure 3:
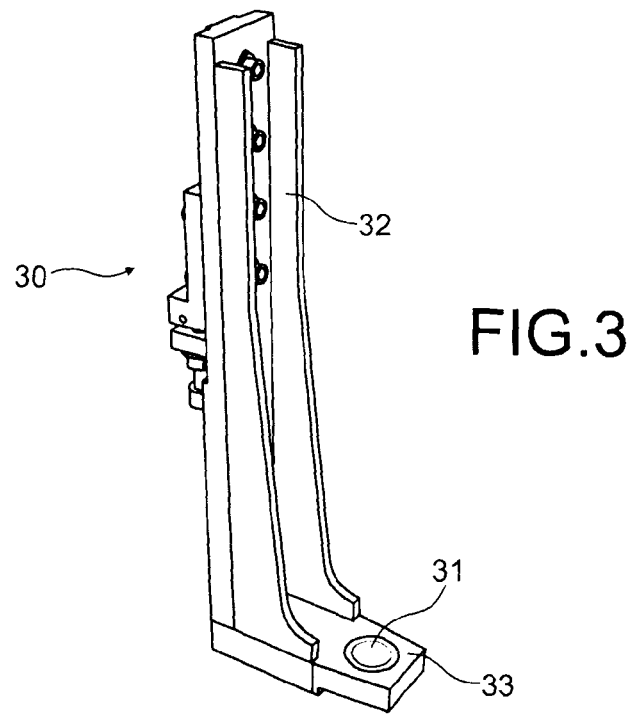
FIG. 3 is a perspective view of the tool holder of the drilling system.

A more precise description of the different elements of the drilling system illustrated in FIGS. 2 and 3 will now be provided.

The support structure 10 primarily comprises a support frame 11, preferably substantially square or rectangular. The frame includes lateral rails 12a and 12b that are substantially parallel to direction X and connecting rails 13a and 13b, fastened to the lateral rails 12a and 12b so as to form the frame 11.

Each rail 12a, 12b, 13a and 13b supports a plurality of feet 14a, 14b, and 15a, 15b, respectively, situated on the same side of the plane formed by the frame 11 and provided to come into contact with the surface to be drilled by adhering members 16a, 16b, and 17a, 17b, respectively, such as a pneumatically actuated sucker. These can also be electromagnetically or hydraulically actuated suckers. The adhering members 16, 17 will be described in detail later.

The lateral rails 12a, 12b preferably have a curve in direction X substantially equivalent to the curve of the panels in that direction. Thus, the drilling system has an optimal adhesion capacity on the panels. Of course, the connecting rails 13a, 13b can also have a curvature suitable to adhere to the panels, in the case where they also have a curvature in direction Y.

Moreover, the lateral and connecting rails can be disassembled without difficulty to adapt the drilling system to the radius (radii) of curvature of the working surface. This configurability of the rails of the drilling system makes it possible to obtain good usage flexibility of the system.

The beam 20 is substantially rectilinear in direction Y and supported by the lateral rails 12a, 12b of the support frame 11. More precisely, the beam 20 is mounted at its ends 21a, 21b in direction Y to the lateral rails 12a, 12b, respectively. The beam 20 can be fixedly mounted on the rails or preferably mounted slidingly, as shown by FIG. 2. When the beam is mounted slidingly, guiding devices 25a and 25b are fixedly mounted at the ends 21a, 21b of the beam in direction Y and mounted by sliding connection on the lateral rails 12a and 12b.

Each guiding device 25a, 25b comprises a housing 26a, 26b that extends in direction X and is arranged substantially above the respective guide rail 12a, 12b in direction Z. The lower portion 27a, 27b of the housing 26a, 26b is adapted to slide along a sliding rod 18a, 18b arranged on the upper portion of the guide rail 12a, 12b.

A motor member 28a, 28b can also be provided and fastened on the frame 26a, 26b to allow the movement of the guiding device 25a, 25b relative to the lateral rail 12a, 12b. Thus, the beam 20 is capable of moving relative to the support structure 10 in direction X.

The tool holder 30 is mounted on the beam 20 and designed to support a drilling tool and possibly other tools making it possible to work on the surface to be drilled.

The tool holder 30 can be fixedly mounted on the beam 20, or preferably mounted by sliding connection in direction Z. In that case, as shown by FIG. 2, a jack 22 and a motor member (not shown) are fastened on the beam 20 to ensure the sliding of the tool holder 30 relative to the beam 20. The fact that the tool holder is slidingly mounted relative to the beam 20 in direction Z makes it possible, during drilling operations, to bring the drilling tool as close as possible to the surface to be drilled, and in the other situations, to move the drilling tool away from that surface to avoid any involuntary contact.

Other than the drilling tool, one or several other effectors can be mounted on the tool holder 20. The purpose of the effectors is to make it possible to carry out all of the operations for assembling the panels. These effectors can in particular comprise the following modules:
shavings suction module,
vision module (camera),
cement deposition module,
fastening insertion module,
welding or adhesion module,
stripping/sanding or painting module.

The tool holder 30 is designed to ensure that the bores are perpendicular to the surface to be drilled. To that end, and as shown in FIG. 3, the tool holder 30 comprises a guide portion 32 mounted on the beam 20 via the jack 22 extending in direction Z and a locking portion 33 substantially perpendicular to the guide portion 32. Thus, the tool holder 30 is substantially L-shaped. According to the invention, the locking portion comprises a locking orifice 31 whereof the central axis corresponds to the drilling axis. The drilling tool 40 is then mounted on the guide portion 32 of the tool holder 30 and comprises an element that cooperates with the locking orifice 31, as described in detail later. The perpendicularity of the drilling tool 40 relative to the overlap area is guaranteed. The drilling axis coincides with direction Z.

With the aim of performing drilling operations, a drilling tool 40 is mounted on the tool holder. According to the invention, the drilling tool is mounted by sliding connection on the tool holder and can thus slide along the drilling axis.

The drilling tool used can be of the type traditionally known by those skilled in the art, like that made by the company Cooper Power Tools and designated "P2 Drill with Concentric Collet Foot." This type of drilling tool is also described in document EP 0 761 351 A, which is included here by reference. This tool 40 is also shown in detail in FIGS. 4 to 8.

Generally, the drilling tool 40 is advantageously used in the present invention to:
position and keep that tool on the tool holder via an expandable centering ring,
form a depth stop by contact of the end of the bearing mandrel on the overlap area, and
this constitutes a particularity unique to the present invention, to generate a contact pressure on the fuselage concentrically to the drilling using the mandrel, in order to ensure direct contact of the panels to be assembled and thereby avoid the formation of fins and the introduction of shavings at the interface provided with interposition cement.

The third function, relative to the pressure exerted on the interface, is a consequence of the particular operating principle of the drilling tool 40 under the specific conditions imposed at the tool holder 30.

In reference therefore to FIGS. 4 to 8, the drilling tool 40 is shown globally including a body 42 extending by a bearing mandrel 51, the end 50 of which is intended to be in contact with the overlap area 4 during the drilling. During the drilling of a hole in the fuselage, the drill (not shown) is provided to move inwardly and concentrically relative to the bearing mandrel 51.

At the front portion of the tool 40, the mandrel 51 is integral with a pressure foot 52, itself integral with an axis 57 or upper axis. Moreover, an expandable ring 56, intended to be introduced into the locking orifice 31 of the tool holder 30, closely fits the mandrel 51 along a tapered contact surface 53 visible in FIG. 4. This tapered contact surface 53, provided to narrow as it gets closer to the end 50 of the mandrel, allows, when a relative movement is exerted along a tapered contact surface central axis 48, between the mandrel 51 and the ring 56, an expansion of that ring ensuring locking thereof in the locking orifice 31. More precisely and as will be detailed later, the relative movement between the expandable ring 56 and the bearing mandrel 51 causes, following the locking of the expandable ring 56 in the locking orifice 31, a movement of the mandrel 51 bearing against the overlap area 4, through the locking orifice and along the tapered contact surface central axis 48 towards said overlap area in order to exert pressure thereon.

Moreover, it should be noted that, throughout the entire duration of the drilling step, the tool holder is static relative to the overlap area 4 in reference X, Y, Z of the aircraft. Thus, when the bearing mandrel exerts pressure on the overlap area, the reaction thereof on the mandrel is not accompanied by a movement of the expandable ring in the direction opposite the direction of the pressure exerted. Indeed, the ring is integral with the tool holder, the latter part being static during a drilling step. In this way, the drilling system according to the invention makes it possible to apply pressure on the overlap area at the desired value.

To obtain this relative movement, the tool 40 comprises a jack 54 integral with the body 42, the end 46 of which is connected by a axis 47 or lower axis, to a pair of connecting rods 55, and more precisely at a lower end of these connecting rods 55 whereof the upper end is hinged on the aforementioned upper axis 57. Moreover, between the parallel axes 47 and 57, the tool 40 has an intermediate axis 58 or double intermediate axis integral with the expansion ring 56, said axis 58 passing through the lumens 45 formed in the pressure foot 52.

Figure 4:
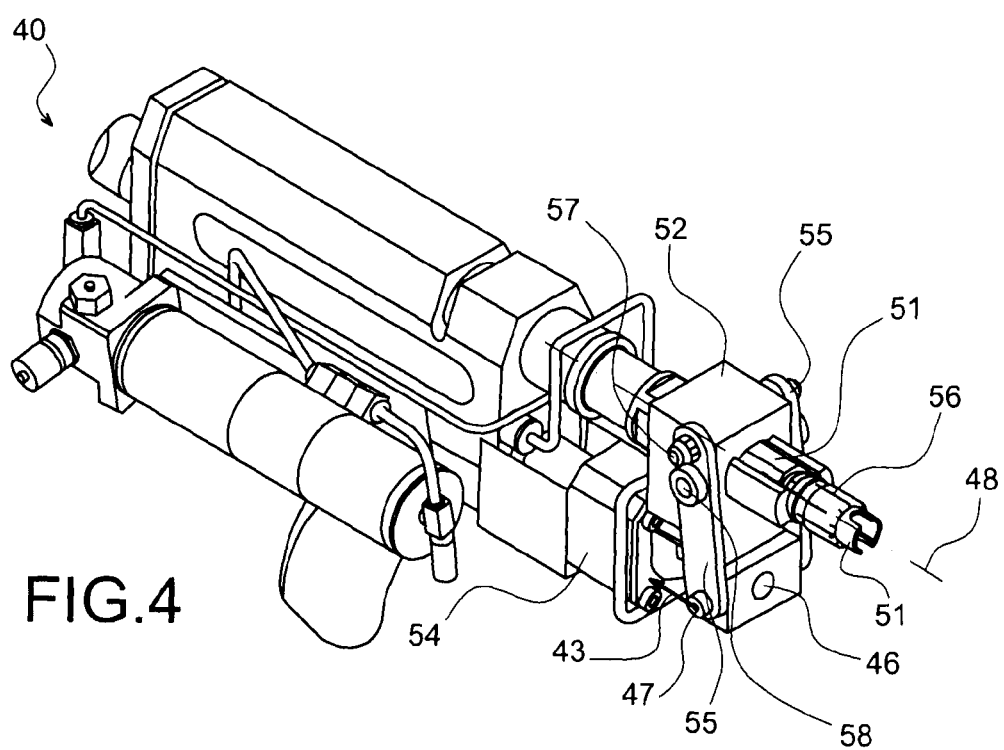
FIG. 4 is a perspective view of a drilling tool according to one embodiment of the invention.
Figure 5:
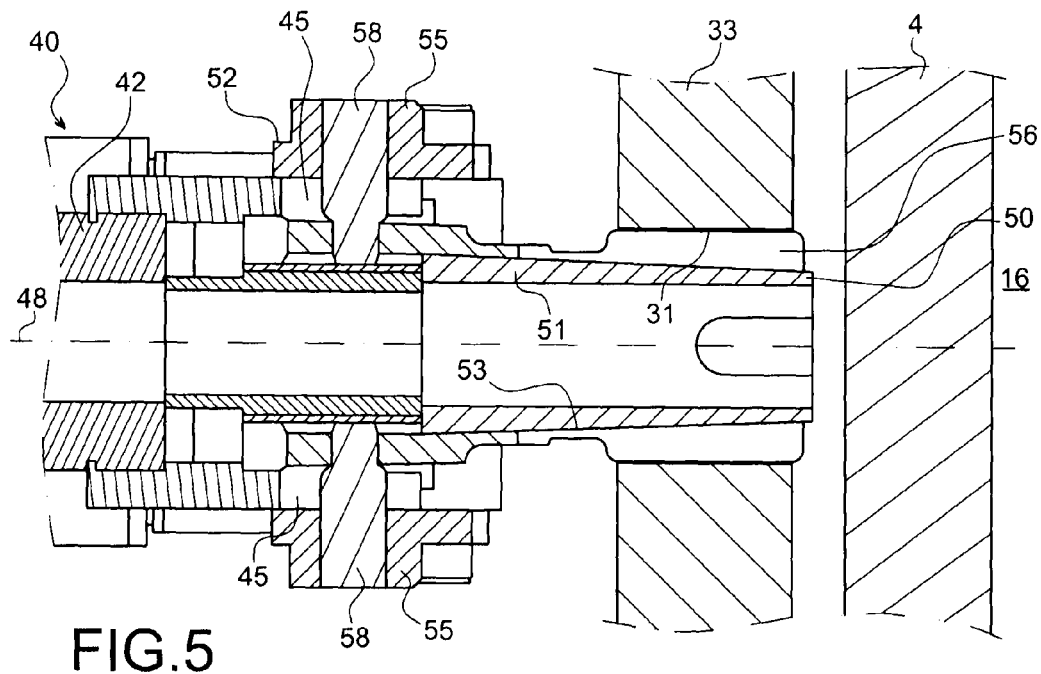
FIGS. 5 to 7 are longitudinal cross-sectional views of part of the drilling tool cooperating with the support tool.

Thus, the design of this tool 40 is such that when the jack 54 is actuated in the direction of arrow 43 of FIG. 4, this causes a displacement of the lower end of the connecting rods 55 in the same direction as that of arrow 43. Such a displacement of the connecting rods 55 under the effect of the jack 54 effectively produces a relative movement between the ring 56 and the mandrel 51, this relative displacement producing an expansion of the ring 56 due to the contact along the tapered surface 53. More precisely, in its principle as described in the prior art, the actuation of the jack 54 produces a backward movement of the ring 56 while the mandrel remains immobile bearing against the area 4, i.e. the axis 57 acts as a pivot and the axis 58 moves in the direction opposite that going towards the panels to be assembled, i.e. along arrow 43, through the lumens 45 of the pressure foot provided to that end. Thus, in that case, it is the ring 56 that, by expanding, simultaneously undergoes a movement relative to the locking orifice in which it is placed, and not the mandrel, which remains fastened relative to that same locking orifice. Still in the prior art, the relative movement is stopped when the ring has been expanded enough to ensure the locking in rotation and translation of the tool relative to the tool holder provided with the locking orifice in question.

In the method according to the present invention, it is, however, done such that the relative movement applied between the ring 56 and the mandrel 51 essentially amounts to a movement of the mandrel in the direction of the overlap area 4, and not a movement of the ring 56 in the direction opposite that of the overlap area, even if the latter movement can be observed until obtainment of a veritable locking of the ring 56 in the locking orifice 31 of the tool holder 30. To that end, one skilled in the art will naturally be able to adapt the design of the various elements in question to arrive at such an operation, in particular by suitably dimensioning the nominal diameter of the expandable ring 56 and that of the locking orifice 31.

Figure 6:
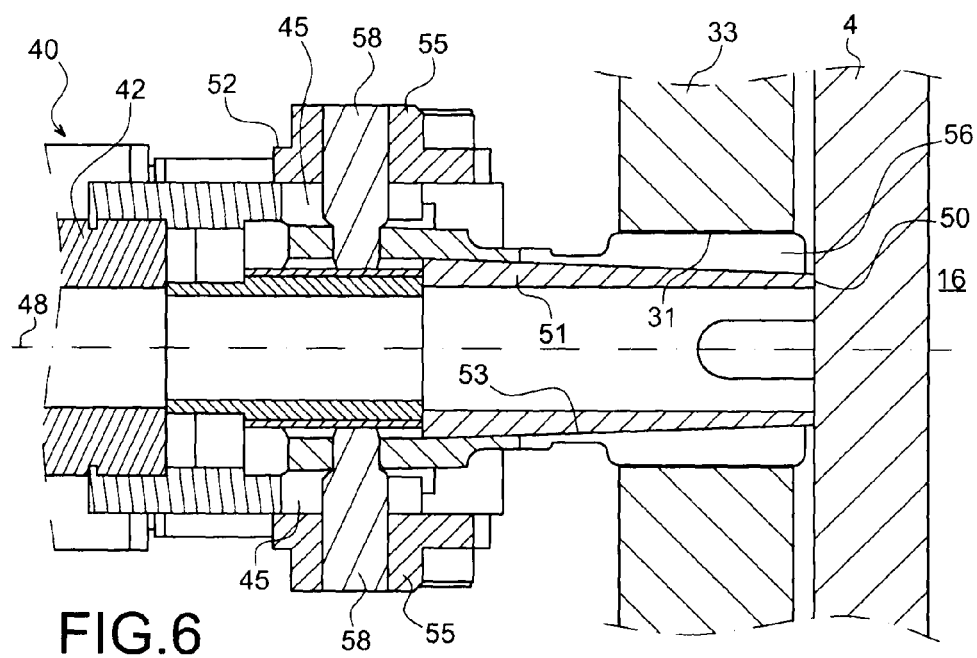

As shown in FIG. 6, illustrating the tool 40 before actuating the jack 54 and just after introduction thereof into the locking orifice 31, a small initial play between the ring 56 and the locking orifice 31, e.g. less than 0.5 mm and preferably around 0.3 mm, easily makes it possible to obtain locking of the ring in that same locking orifice 31 extremely quickly after the beginning of the application of the relative movement, this play nevertheless being sufficient to ensure an easy introduction of the expandable ring into the locking orifice 31 before drilling. To that end, it has been observed that the application of an H7 tolerance for the locking member of the tool holder 30 could prove effective to obtain the desired effect.

Figure 7:
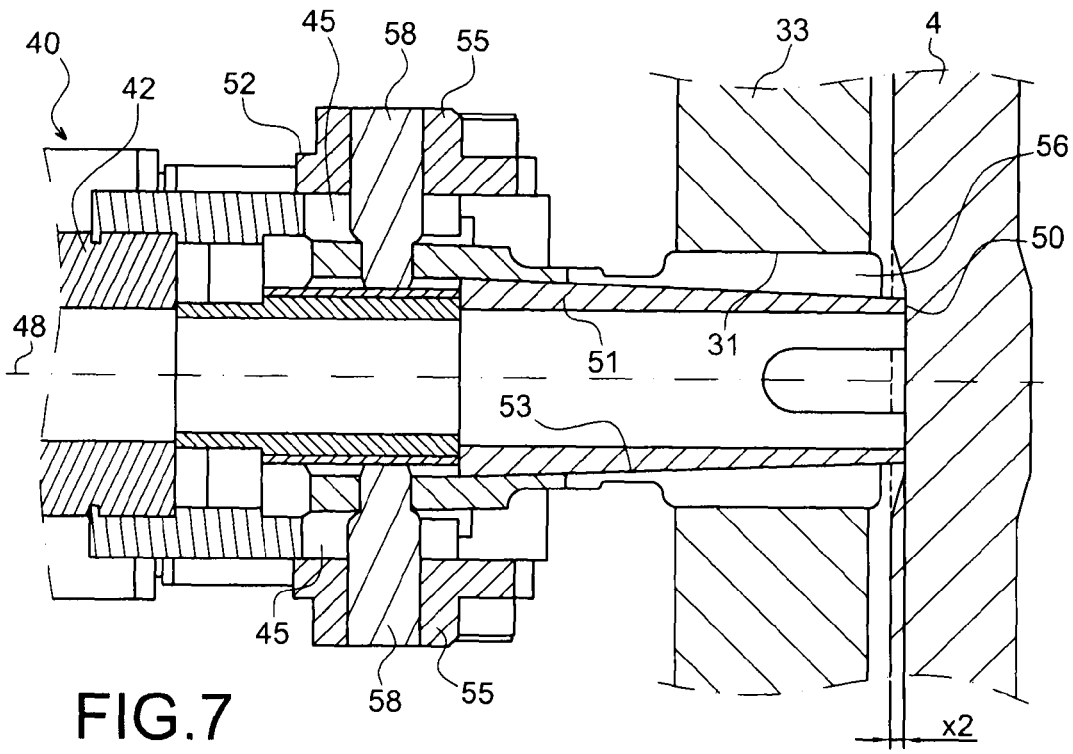

Moreover, the application of the relative movement between the expandable ring 56 and the bearing mandrel 51 is preferably done so as to create a movement of the mandrel bearing against the overlap area 4 and through the locking orifice 31, over a distance (x2), shown in FIG. 7, respecting the condition $(x2) > 0.90 \cdot (x)$, where (x) (not shown) corresponds to a total distance of the relative movement applied between the ring 56 and the mandrel 51. The aforementioned relationship effectively translates the desire to essentially obtain a movement of the mandrel 51 through the locking orifice 31, rather than a movement of the ring 56 through that same locking orifice 31 in an opposite direction.

As a result, unlike the prior art, the relative movement causes a displacement of the mandrel 51 in reference X, Y, Z of the aircraft, driving with it the pressure-stressed portion of the area 4 as shown in FIG. 7, the ring 56 remaining substantially immobile in that same reference.

In practice, it has been observed that the axis 58 then acts as a swivel while remaining fixed in reference X, Y, Z of the aircraft, and the axis 57 moves in the direction going towards the overlap area 4, opposite the direction of the arrow 43.

Such a situation has the advantage of being able, via this particular desired operation, to apply, in the zone adjacent to the drilling, a pressure force that can be sufficient to:
- ensure the creep of the sealant in the immediate vicinity of the orifice of the fuselage, so as to ensure metal-metal contact between the two panels of the area 4;
- avoid the introduction of shavings and cutting fluid at the interface; and
- avoid the formation of fins at the drilling inlet and outlet of the interface.

It will now be demonstrated that the contact pressure exerted by the mandrel 51 of the tool 40, during drilling of an orifice on the fuselage, can be mastered as a function of various parameters.

At the tapered contact surface 53 between the mandrel 51 and the ring 56, the mandrel 51 stresses the ring through a pressure proportional to the relative displacement of these two elements and normal to the contact surface. It also undergoes friction with angle ☐1 that tends to oppose the relative displacement.

During its expansion in the orifice 31 of the tool holder 30, the ring 56 undergoes radial pressure $P_{56}$ proportional to the relative displacement between the mandrel 51 and the ring 56. If $\Delta x$ is this displacement, the resulting pressure increase $\Delta P_{56}$ is such that:

$$\Delta P_{56} = K \Delta x \, tg\alpha / S$$

where K is a constant function of the elasticity of the parts present, S being the contact surface between the ring 56 and the orifice 31 of the tool holder 30.

If $\phi 2$ is the coefficient of friction at the interface between the ring 56 and the orifice 31, $F_{56}$ designates the axial result of the frictional stresses of the ring 56 in the orifice:

$$F_{56} = P_{56} \cdot S \cdot tg\phi 2$$

First, a first situation is considered in which there is no reaction of the overlap area 4 against the mandrel 51, i.e. the tool is centered and locked in the tool holder 30 without it being opposite an obstacle. The ring 56 is introduced without or almost without play in the bore of the tool holder 30. Under these conditions, when the jack 54 is actuated, two kinematics can be produced. In the first kinematic, which is the most probable and corresponds to the desired effect, the axis 58 remains immobile in reference X, Y, Z of the aircraft, and acts as a swivel. In the second kinematic, unlike the first, it is the axis 57 that remains immobile in reference X, Y, Z of the aircraft and acts as swivel, because the ring 56 moves relative to the tool holder 30 in the direction opposite that of the area 4.

The jack 54, the axis 57 and the axis 58 being connected by the rigid connecting rods 55, for these two kinematics, the relative speed and displacement between the elements 56 and 51 are the same.

The stresses applied on the mandrel 51, on the ring 56 and the jack 54 being proportionate to that relative displacement, they are also the same for the two kinematics. Thus, the most probable kinematic solution is that which leads to the minimal energy dissipation. In this respect, the energy dispensed by the jack 54 is distributed as follows:
- for the first kinematic, between the friction at the tapered surface 53 between the elements 51 and 56, the radial elastic deformation of the various elements (holder 30, ring 56, mandrel 51), following the expansion, and the friction at the hinges;
- for the second kinematic, between the same dissipation sources as those mentioned above, having the same intensity, to which the friction is added between the ring 56 and the locking orifice 31.

Energetically, the first kinematic is therefore more favorable, and it is therefore that one that will effectively be observed during the implementation of the method. Thus, once there is contact between the ring 56 and the locking orifice 31 of the tool holder 30, the ring 56 remains immobile relative to the holder and the action of the jack 54 leads to an "extraction" of the mandrel 51.

Moreover, by situating itself in the case of the first kinematic indicated above, without obstacle before the mandrel, the actuation of the jack 54 causes the displacement of the mandrel 51 relative to the holder 30 towards the area 4 and along the axis 48, until the stress applied to the jack is equal to the reaction stress of the ring 56 on the mandrel 51, said stress hereinafter being called $F_{51}$.

By isolating the mandrel 51 in that equilibrium situation, on the condition that the end of travel of the jack 54 is not reached before that state, along the axis 48 also corresponding to the drilling axis, the mandrel 51 is therefore in equilibrium under the action of two forces that are therefore equal in intensity and direction, but in the opposite direction, i.e.:
- $F_{54} + F_{57}$, the forces applied by the jack 54 and the axis 57, respectively, and
- the reaction of the ring 56 on the mandrel 51, i.e. $F_{51}$.

Figure 8:
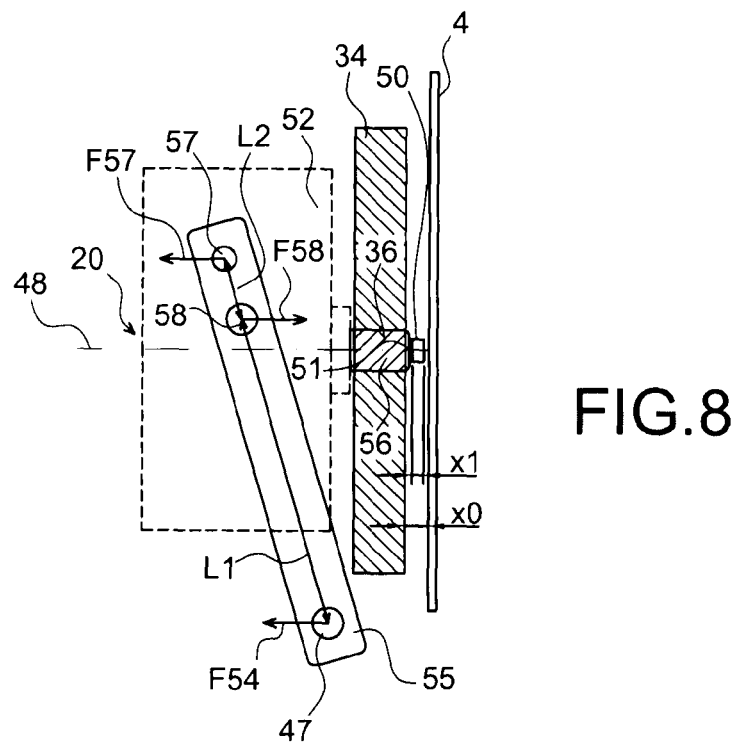
FIG. 8 is a diagrammatic side view of part of the drilling tool cooperating with the tool holder.

Each connecting rod 55 is in equilibrium under the action of three parallel forces $F_{54}$, $F_{57}$ and $F_{58}$, as shown in FIG. 8. It is deduced that:

$$F_{57} = \frac{L1}{L2} F_{54},$$

the lengths L1 and L2 corresponding to the distance between the axis 47 and the axis 58, and the distance between the axis 58 and the axis 57, respectively; and $$F_{51} = F_{54}^{MAX} \left(1 + \frac{L1}{L2}\right),$$

$F_{54}^{MAX}$ being the maximum force deployed by the jack 54.

It should be noted that this force is obtained for a displacement of the mandrel 51 along the axis 46 by a distance called $x_1$ and shown diagrammatically in FIG. 8, from its initial position counted at the beginning of the contact between the ring 56 and the orifice 31 of the tool holder 30.

As previously indicated, the force $F_{51}$ is proportionate to the relative displacement between the elements 56 and 51, therefore proportionate to the displacement $x_1$, or $F_{51}=C_{51}x_1$, $C_{51}$ being a stiffness coefficient that gives an account of this proportionality.

Looking at a different configuration now where an obstacle, in this case the overlap area 4, is positioned against the mandrel 51 in the initial position relative to the tool holder, when the jack 54 is actuated, the mandrel 51 will then move until it reaches an equilibrium position $x_2$ considered along axis 46, position such that:

$$x_2 < x_1, \text{ and}$$
$$F_{54}^{MAX}\left(1 + \frac{L1}{L2}\right) = C_{51}x_2 + R$$

It can be deduced that the reaction R, equivalent to the thrust/pressure force on the fuselage, is given by:

$$R = C_{51}(x_1 - x_2),$$
$$\text{or } R = F_{54}^{MAX}\left(1 + \frac{L1}{L2}\right)\left(1 - \frac{x_2}{x_1}\right)$$

It is therefore possible, in particular, through a careful choice of the adjustment of the non-expanded ring 56, in its nominal state, in the locking orifice 31 of the tool holder 30, through the distance between the holder 30 and the overlap area 4, through the choice of the capacity of the jack 54, and, if applicable, through the connection of lever arms at the connecting rods 55, to control, in a given range, on one hand, the travel necessary to achieve the metal-metal contact between the panels at the interface of the assembly, and on the other hand, the pressure to be applied. These adjustments can for example be obtained through successive trials.

For information, once this equilibrium position is achieved, the stress remains applied on the overlap area 4, the removal of the mandrel 51 under the effect of the elastic reaction being prevented by the friction reigning between the tapered surface of the mandrel 51 and that of the ring 56, on the condition that R is such that the corresponding reaction does not leave the adhesion cone.

Thus, the mandrel 51, after releasing the jack 54, is, along the axis 46, in equilibrium under the action of two forces, i.e.:
R, and
the reaction corresponding to R which is:

$$C_{51}x_2 \frac{\tan(\varphi 1 - \alpha)}{\tan(\alpha)} \geq R = F_{54}^{MAX}\left(1 + \frac{L1}{L2}\right) - C_{51}x_2$$

The ratio $$\frac{\tan(\varphi 1 - \alpha)}{\tan(\alpha)}$$

is noted "$\tau$" for a given position $x_2$. Rmax is then defined by:

$$\left(F_{54}^{MAX}\left(1 + \frac{L1}{L2}\right)\right)\tau = R\max(1 + \tau)$$

-continued $$\text{or, } R\max = F_{54}^{MAX} \frac{\left(1 + \frac{L1}{L2}\right)}{\left(1 + \frac{1}{\tau}\right)}$$

"$\tau$" is calculated considering that the radial pressure is proportionate to $\tan(\alpha)$, $\alpha$ being the half-angle of the taper of the contact surface 53. The frictional force opposing the "ejection" of the mandrel 51 under the effect of the elastic reaction of the fuselage is inverted relative to the frictional force that opposes the sliding of the mandrel 51 in the ring 56, leading to the expression in $\tan(\square 1-\alpha)$ instead of $\tan(\square 1-\alpha)$ found for $F_{51}$.

In the preferred case of the tool 40 as described above, of the "Concentric Collet" type, $$\frac{L1}{L2} \cong 5,$$

$\alpha=2.5°$, $\phi 1=8°$. Subsequently we have $$\frac{x_2}{x_1} = \frac{1}{3},$$

potentially leading to R max$\cong 4F_{54}^{MAX}$.
Let $$\frac{1}{\tau} = 0,45,$$

which assumes a high contact stiffness between the overlap area 4 of the fuselage and the end 50 of the mandrel 51.

In practice, the travel is not a priori regulated in this way, and the contact stiffnesses are not sufficient to achieve such conditions. More generally, we see $R \cong F_{54}^{MAX}$. In all cases there is therefore a satisfactory safety margin relative to the stability of the system.

This effectively observed value of the stress is explained inasmuch as, starting from the initial contact of the mandrel 51 with the fuselage, first, the displacement along axis 46 thereof has the essential effect of making the interposition cement creep. The force R is due to the creep of the cement and the local elastic deformation of the outer panel. This process continues over a distance of about a millimeter, until the metal-metal contact is established. At that time, the stress R increases more quickly, because the deformation this time concerns a double thickness, i.e. the two panels 6, 8, which is supported at a small distance via pressurization devices 12 of the inner side of the fuselage, still in place. The ratio $$\frac{x_2}{x_1}$$

is therefore around 0.8 to 0.85. As a result, it is clear that the system is very tolerant regarding distance variations between the two panels 6, 8 to be drilled.

Subsequently, the pressure commonly applied to the pressure of the sheets by the drilling tool is easily between 600 N and 1200 N, depending on the thickness of the panels present.

Other types of drilling tools could of course be used to carry out the method according to the invention, such as, for example, alternatives using either a jack acting directly on the ring 56, or cam systems instead of connecting rods 55, the operating principle and adjustment of the parameters related to the tool holder 30 being equivalent in all ways.

In reference again to FIG. 8, it is preferably provided that the thickness of the locking portion 33 of the tool holder 30 is slightly smaller than the length of the ring 56, along the axis 46. The distance $x_0$ between the inner face of the locking portion 33 of the tool holder 30 at the bore and the fuselage 4 is also such that the ends of the ring 56 protrude on either side of the locking orifice 31, during the introduction of said ring therein, introduction stopped by the contact of the mandrel 51 with the fuselage 4. Thus, the distance $x_0$ is preferably set such that:

- the adapted pressure can be applied near the hole to be drilled (distance $x_2$ relative to "vacuum" $x_1$);
- the two ends of the ring 56 are outside the locking orifice 31 (distance $x_0$).

These two conditions are set by the height between the tool holder and the overlap area, and by the manufacturing shape tolerance of the tool holder 30 in comparison with the shape tolerance of the fuselage at the location of the overlap area. One skilled in the art will be able to determine this distance and the tolerance over that distance through a traditional chain of dimensions calculation. The manufacturing tolerance will be larger when the ratio $$\frac{x_2}{x_1}$$

has been chosen carefully. Under the conditions previously mentioned, with a ratio $$\frac{x_2}{x_1}$$

in the vicinity of 0.85, i.e. such that the condition $R \cong F_{54}^{MAX}$ is verified, the tolerance over the distance $x_0$ is +/−0.2 mm.

The technical problem to be resolved therefore consists of ensuring pressure conditions adapted to the interface during drilling and is therefore resolved by a reasoned choice of the characteristics of the different elements of the drilling system (material, dimensioning, etc.) relative to the operating characteristics of the "Concentric Collet" drilling tool and the pressure needs at the interface, on the overlap area. Knowing that the pressure is preferably between 400 N and 1200 N, and ideally around 600 N, these conditions can be obtained by:

- adjusting the distances $x_1$ and $x_2$ via the distance $x_0$ and the adjustment of the locking orifice 31;
- the choice of the "operating point" (distance $x_2$) of the drilling tool, relative to the fuselage 4;
- the force developed by the jack 54; and
- the choice of the material making up the tool holder 30 and preferably the absence of steel lining of the locking orifices.

Of course, the pressurization of the overlap area 4 is done slightly before the actual drilling of the orifice desired in that area, this drilling being done using a drill (not shown) passing through the mandrel 51 coaxially continuing to exert the desired pressure to globally avoid the formation of fins on the panels 6, 8.

More precisely, the drilling-countersinking is done using a combined drill and countersink, in a single operation. The mandrel 51, the end 50 of which is in contact with the fuselage 4, defines an axial stop that makes it possible to ensure the depth precision of the counter sink. The counter sink depth is fixed so as to ensure suitable conditions for making the rivet head flush. The suitable adjustment of the counter sink depth is for example determined by laboratory trials that make it possible to define, for each rivet diameter, the counter sink depth needed for the flush fitting conditions of its head to be verified after crushing thereof.

The stopping of the penetration, i.e. the stopping of the tool's advancement, is ensured by a stop connected to the mandrel 51, itself in contact with the fuselage. Thus, the countersinking depth can be ensured even in case of fluctuation of the distances $x_0$ and $x_2$.

The drilling/boring of aluminum alloys, making up the majority of current fuselages, remains delicate without lubrication. Spraying is avoided here due to the risk of introduction of cutting fluid at the interface provided with interposition cement. To that end, the drilling is preferably done under oil micro-spraying, via the center of the tool or laterally when the drilling is done at a high cutting speed, i.e. in the vicinity of 15,000 rpm or more.

The lubrication quantities are preferably adapted to the drilling and countersinking diameter, and are generally set in a range from 3 to 50 ml per hour of a lubricant product whereof the maximum viscosity is 400 mm²/sec. This oil micro-spraying greatly improves the drilling quality and makes it possible both to use less powerful, and therefore lighter, drilling tools, and to reduce the penetration stress. The use of oil micro-spraying is made possible by the sufficient pressure that reigns at the metal-metal interface at the junction, and which, combined with the small quantity, at the oil viscosity and any suction, prevents any introduction of oil in the interposition cement.

Advantageously, the machine can be equipped with a suction device at the pressure foot 52, which makes it possible to discharge the shavings and oil vapors towards a recovery center. This suction prevents any soiling of the cement joint situated outside the fuselage. For this same reason of easy discharge of the shavings, the use of helical flute drills is preferable.

Under certain circumstances, shavings may be projected in the inner fuselage, at the outlet of the orifice. These can then be deposited on the assembly interface, particularly in the lower portion of the aircraft, and thereby risk being introduced into said interface. Under these conditions, it is advantageous to protect the interface line, referenced 2 in the figures, by an adhesive strip called "masking tape."

Preferably, the tool holder is made from aluminum or one of its alloys, and the expandable ring 56 is made of steel.

Indeed, it is noted that the tool holder 30 must preferably be able to perform the following functions:

- the immobilization of the drilling tool 40 in rotation and translation in the locking orifice 31, and only by the frictional force of the expandable ring 56 in the orifice 31 of the tool holder 30, and
- a sufficient lifetime of the tool holder 30.

The solution indicated above is preferably used, given that the friction between the aluminum of the tool holder 30 and the steel of the ring 56 is nearly twice as high as a steel-steel friction, which makes it possible to facilitate the rotational and translational locking of the expandable ring 56 relative to the tool holder 30.

However, this preferred solution has a lower resistance to wear. In this respect, it appears that the wear of the tool holder 30 remains largely acceptable once it is uniform along the contact surface between the ring 56 and the locking orifice 31. For this condition to be verified, but also to avoid more pronounced wear at the input and output of the locking member 31, preferably the largest possible contact surface is sought between the ring 56 and said locking orifice 31. To that end, the tool holder 30 is designed and arranged such that before the relative movement between the expandable ring 56 and the bearing mandrel 51, when the drilling tool is positioned with its bearing mandrel 51 passing through the locking orifice and in contact with the overlap area 4, the expansion ring 56 protrudes on either side of the locking member 31. This preferred position must also preferably be kept until locking of the ring 56 in the locking orifice 31.

Thus, the thickness of the locking portion 33 of the tool holder 30 is preferably slightly smaller than the length of the expandable ring 56 along the tapered contact surface central axis. The initial spacing of the tool holder 30 relative to the overlap area to be assembled is also provided accordingly.

A second embodiment of the invention, in which the drilling system is capable of moving independently along the overlap area, will now be described in detail in reference to FIGS. 9 and 10.

Figure 9:
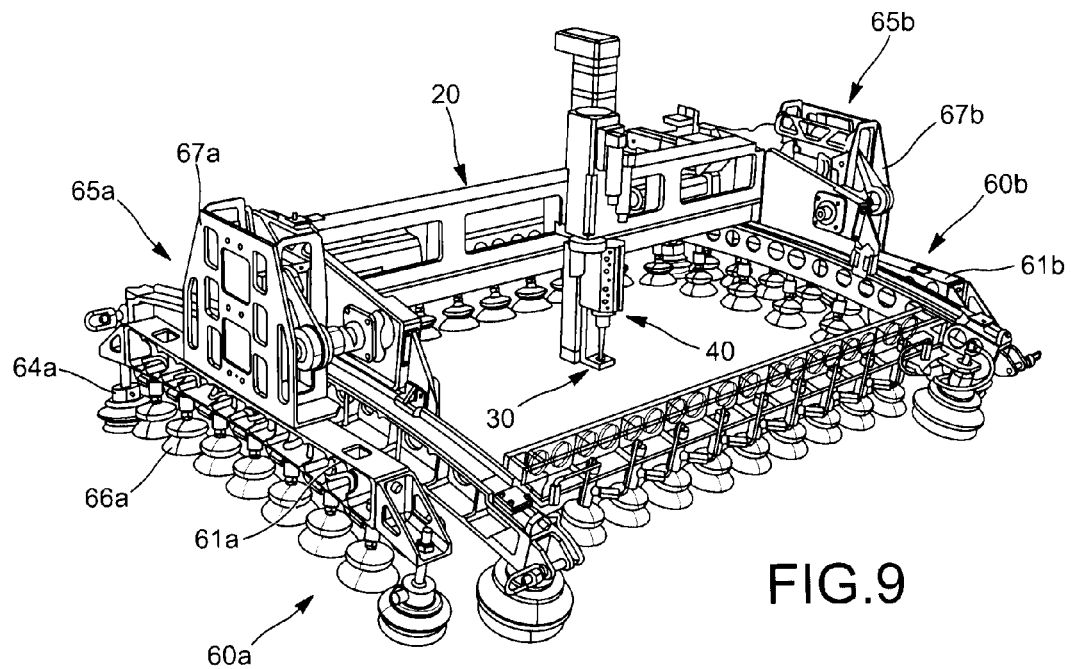
FIG. 9 is a perspective view of a drilling system according to a second embodiment of the invention.

As illustrated in FIG. 9, the drilling system according to this embodiment of the invention also comprises two advancement assemblies 60a, 60b, each mounted slidingly in direction Z at one end 21a, 21b of said beam 20. More precisely and preferably, the two advancement assemblies are mounted to the frame 26a, 26b of the sliding members 25a, 25b. Thus, the advancement assemblies 60a, 60b can, on one hand, slide in direction Z relative to the beam 20, and on the other hand, move in direction X relative to the support structure 10 integral with the beam 20. The drilling system according to this embodiment of the invention is designed to be able to adhere or not adhere to the overlap area, thereby allowing its displacement by creeping over that overlap area.

The two advancement assemblies 60a and 60b respectively comprise an advancement rail 61a, 61b. Each advancement rail 61a, 61b is arranged near and parallel to the lateral rails 12a, 12b, outside the support frame 11.

Each advancement rail 61a, 61b supports a plurality of feet 64 situated on the same side of the plane formed by the frame 11 and provided to come into contact with the working surface by catching members 66 such as pneumatically actuated suckers. These can also be electromagnetically or hydraulically actuated suckers. The catching members 66 will be described in detail later.

Each advancement assembly 60a, 60b preferably comprises an elevating member 65a, 65b capable of ensuring the relative movement of the advancement assemblies relative to the beam 20 in direction Z. The elevating members 65a, 65b each comprise a housing 66a, 66b, a motor member (not shown) for example controlling a jack (not shown) implemented to perform the relative movement of the advancement assemblies 60a and 60b relative to the carrier 20.

To adhere to the overlap area, the support frame 11 and the advancement rails 61a, 61b comprise adhesion members, for example pneumatic suckers. Two types of suckers, primary and complementary, can advantageously be used.

The primary suckers are arranged at each end of the advancement rails, as well as at each corner of the support frame 11. They are preferably equipped with a sensor for the altitude positioning referential of the assembly of the drilling system relative to the overlap area. They are fixed and mounted slightly swiveling to offset any geometric flaws of the panels 6, 8 and guarantee good bearing on said panels.

Complementary suckers are advantageously used, which make it possible to secure the adhesion of the drilling system. They are arranged at regular intervals between the primary suckers, on the advancement rails 61a, 61b and the rails 12a, 12b of the support frame 11. They can easily accept irregularities of the panels 6, 8 without having an influence on the altitude positioning of the drilling system. Like the primary suckers, the complementary suckers can be configured so that they can be quickly disassembled by an operator and reassembled without specific adjustment. Because of this, it can be provided to remove suckers in certain specific areas where there can be possibilities of interference or bulk problems with elements of the airplane. Each sucker is mounted on a foot fixed to the corresponding element. The generation of the vacuum in each sucker is ensured by an independent venturi system, traditional for those skilled in the art. In case of non-contact with the panel 6 or 8, for example when the sucker is located at a rivet, the venturi system is in all cases controlled. Moreover, each sucker is equipped with a by-pass valve. In case of decrease in the vacuum level above the valve, a check valve automatically closes the circuit and isolates the vacuum volume in the sucker. A check valve in the reverse direction makes it possible to deposit the sucker by counter-blowing. In order to preserve the configurability of the sucker, the control of the valve is brought back into the sucker holder and the pneumatic connection is done directly in the corresponding element.

As shown by FIG. 9, the side rails 12a, 12b as well as the advancement rails 61a, 61b have a curvature in direction X substantially equivalent to the curvature of the panels in that direction. Thus, the drilling system has an optimal adhesion capacity on the panels. Of course, the connecting rails 13a, 13b can also have a suitable curvature to adhere to the panels, in the case where they have a curvature in direction Y.

Moreover, the advancement rails 61a, 61b as well as the side rails 12a, 12b and connecting rails 13a, 13b can be disassembled without difficulty to adapt the drilling system to the radius (radii) of curvature of the work surface. This configurability of the rails of the drilling system makes it possible to obtain good usage flexibility of the system.

The displacement mode of the self-contained mobile drilling system according to this embodiment of the invention will now be described in detail in reference to FIG. 10.

The self-contained mobile drilling system is positioned manually or automatically over the junction, circumferential or longitudinal, to be made. Once positioned, the system automatically performs the drilling steps, as well as potentially the additional operations making it possible to perform the assembly in a work area defined by the support frame. Once these operations are completed, the assembly of the drilling system will move autonomously to the next work area, until complete production of the junction. Several drilling systems can work simultaneously on the same junction in order to reduce the time necessary to perform the assembly operations.

Figure 10A:
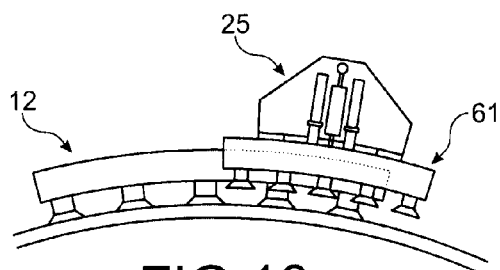
FIGS. 10a to 10g are diagrammatic side views of the drilling system according to the second embodiment of the invention at different movement moments.
Figure 10B:
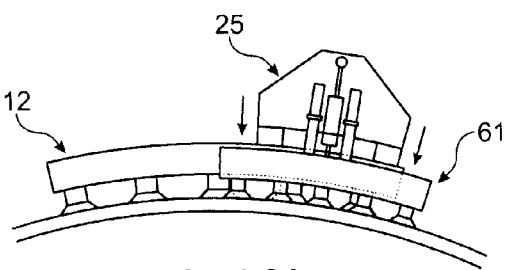
Figure 10C:
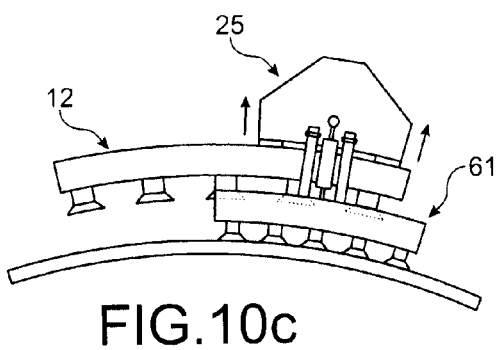
Figure 10D:
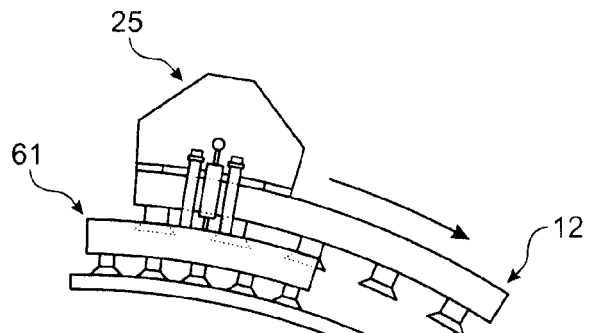
Figure 10E:
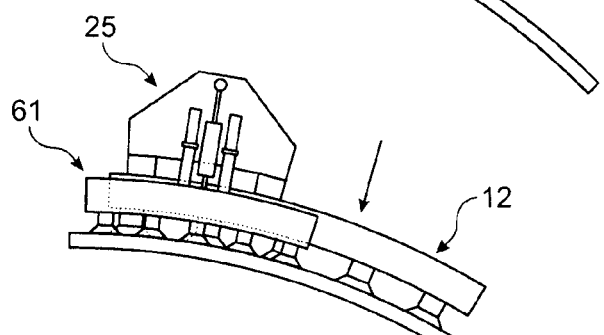
Figure 10F:
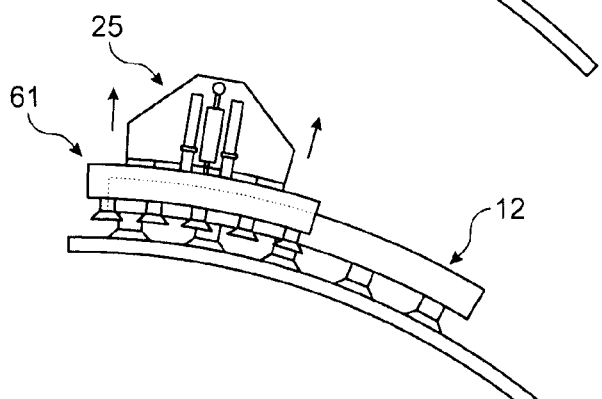
Figure 10G:
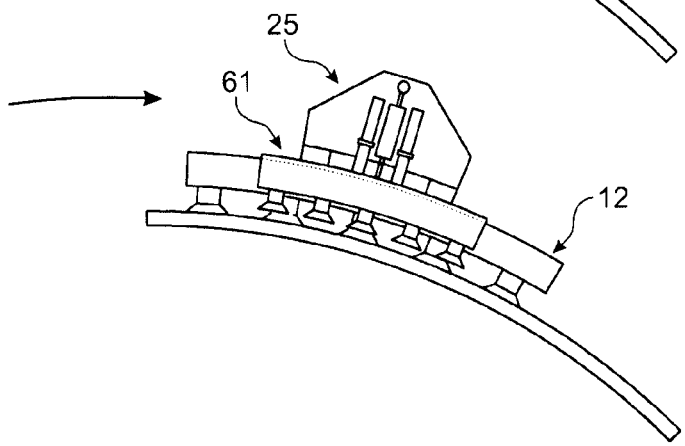

As shown in FIG. 10b, when the set of operations is carried out in the work area, the two advancement rails lower so as to put their suckers in contact on the panels. The suckers secured on the support frame can then be unstuck (FIG. 10c) while keeping the adhesion of the drilling system on the panels by the suckers of the two advancement rails. The support structure/beam can then be slightly raised along Z and translate along the two advancement rails in order to reach the following work area, as shown by FIG. 10d. Once positioned above the work area, the support structure/beam assembly can then be put back in contact with the structure via their suckers (FIG. 10e). The suckers of the two advancement rails are then unstuck and the advancement rails slightly raised in direction Z (FIG. 10f). The drilling and possibly assembly steps are then carried out (FIG. 10g). This cycle is repeated until the drilling system has intervened on all of the work areas.

In the case of a rotational shift of the drilling system relative to direction Z, a limited sliding variation of the sliding member 25a (25b resp.) relative to the sliding member 25b (25a, resp.) enables slight pivoting of the drilling system around the Z axis, so as to reposition in the desired direction. Of course, this position correction step assumes that the support frame 11 and the beam 20 are made from a material having a sufficient shearing deformation capacity. Moreover, it is advantageous for this step to be carried out when the support frame 11 does not adhere to the panels 6, 8, the advancement rails 61a, 61b being in the adhesion position. Lastly, preferably, the drilling step is preceded by a step for verifying the position in which a position sensor (not shown), for example by visual recognition, detects at least one reference on the panels so as to check the positioning of the drilling system. In the case where the positioning is incorrect, the position correction step, as previously described, is carried out.

In the case where the drilling system performs the placement of fastening members, it is advantageous for it to cooperate with an operator to perform the tightening of the fastenings. Fastenings of the "lockbolt" type make it possible to be introduced into the hole drilled by the same side of the panels as that where the drilling system is located. The drilling system then cooperates with an operator located on the other side of the panels. In a first step, the drilling system performs the placement of a "lockbolt" fastening in the drilled hole and ensures its maintenance while the operator places a crimping ring on the crimping rod of the fastening. The crimping ring is placed abutting against the inner surface of the inner panel. In a second step, the operator uses a riveting effector that acts on the rod and the crimping rod. As long as the riveting effector does not exert a determined tractive effort, the drilling system ensures the maintenance of the fastening. To that end, communication means are provided between the drilling system and the riveting effector to communicate the value of the measured tractive effort to the drilling system in real time. Lastly, when the tractive effort reaches the determined value thereby translating that the fastening is crimped, the drilling system receives permission to go to the following drilling step. This cooperation between the self-contained mobile drilling system and an operator during crimping operations of the fastenings placed makes it possible to maintain the creep of the sealant at the interface between the panels and to guarantee the metal-metal contact of the panels at the fastenings.

Figure 11:
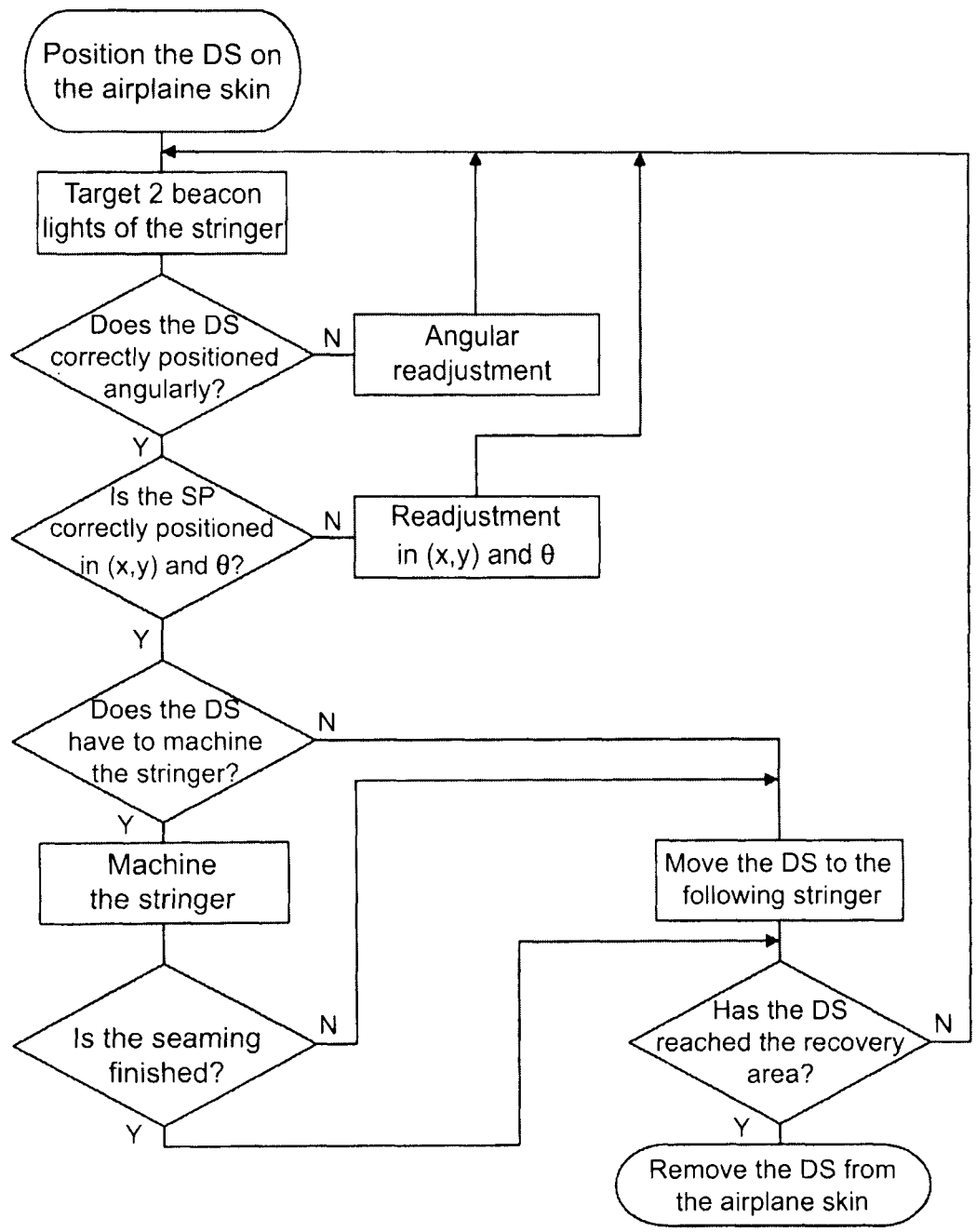
FIG. 11 is a flowchart illustrating the operating procedure of the drilling system according to the second embodiment of the invention.

The different steps of a completely non-limiting example of an operating procedure of the drilling system are now described in reference to FIG. 11.

Step 1 consists of positioning the drilling system on the skin of the airplane.

In step 2, the drilling system targets, for example by an optical view device, two beacon lights that for example indicate the position and orientation of a stringer arranged on the inner side of the skin. The stringers can be weld rivet heads.

The drilling system determines its angular position relative to the beacon lights (step 3). If it is not correct, it proceeds with an angular adjustment (step 3A) and resumes step 2. If the angular position is correct, it then determines its position relative to the curvilinear coordinates (X,Y) of the beacon lights along the surface of the skin (step 4). If it is not correct, it proceeds with an angular readjustment and adjustment of (X,Y) (step 4A) and resumes step 2.

The drilling system determines whether it must machine the localized stringer (step 5). If yes, it machines it following a procedure detailed later (step 6). If not, it moves up to one of the following stringers (step 8).

If the seam is finished (step 7), the drilling system determines whether it is in the recovery area (step 9). If it is not, it resumes the procedure from step 2; and if it is, it can be removed from the skin of the airplane (step 10). If the seam is not finished, it moves up to one of the following stringers (step 8).

Of course, various modifications can be made by one skilled in the art to the invention just described, solely as a non-limiting example.

The invention claimed is:

1. A drilling system comprising:
a support structure to be mounted on a surface to be drilled,
a beam supported by the support structure,
a tool holder supported by said beam, said tool holder having a locking orifice, and
a drilling tool mounted on said tool holder for drilling in the direction of a drilling axis, wherein a mounting of the tool holder on the beam and a mounting of the drilling tool on the tool holder each comprise a sliding connection which permits sliding in a direction parallel to the drilling axis defined by said tool,
wherein said drilling tool comprises:
a bearing mandrel intended to come into contact against the surface to be drilled, and
an expandable ring closely fitting the bearing mandrel along a tapered contact surface and adapted so that a relative movement along a tapered contact surface central axis between the bearing mandrel and the ring procures an expansion of said ring capable of ensuring its locking in the locking orifice,
wherein said expandable ring and said bearing mandrel are configured such that said relative movement creates a movement of the bearing mandrel against said surface to be drilled and through said locking orifice, over a distance x2 respecting the condition x2>0.90·x, where x corresponds to a total distance of the relative movement applied between the ring and the mandrel,
wherein the drilling system being arranged and configured so that the relative movement between the ring locked in the locking orifice and the bearing mandrel procures, by movement of the drilling tool relative to the tool holder via the slide connection, a movement of the bearing mandrel towards the surface to be drilled, through the locking orifice.

2. The drilling system according to claim 1, wherein the tool holder comprises a first portion extending substantially parallel to the drilling axis, the first portion being mounted on the beam and supporting the drilling tool, and a second portion extending substantially orthogonal to the drilling axis and including said locking orifice.

3. The drilling system according to claim 1, wherein the drilling tool includes
a drilling tool body integral with said mandrel, and
a jack having a cylinder integral with said tool body and a piston connected to the expandable ring.

4. The drilling system according to claim 1, wherein said tool holder is slidingly mounted on said beam along the drilling axis.

5. The drilling system according to claim 1, wherein said beam is mounted on the support structure along a first axis substantially perpendicular to the drilling axis.

6. The drilling system according to claim 5, further comprising:
- at least two advancement assemblies, each mounted slidingly to said beam along an elevation direction substantially parallel to the drilling axis,
- hooking members adapted to adhere on said surface to be drilled, said support structure and said advancement assemblies each supporting the hooking members, and
- a control member controlling the relative movement of the advancement assemblies relative to the beam and the relative movement of the beam relative to the support structure.

7. The drilling system according to claim 6, wherein:
- the beam comprises two sliding members, each being fastened to one end of said beam and connected by slide connection to the support structure,
- each sliding member being equipped with a motor member ensuring the sliding of said sliding member on the support structure,
- at least one sensor for detecting an orientation of the support structure relative to a desired movement line, and
- a control unit for controlling said first and second motor members of said beam so as to bring the support structure back to a determined position relative to the desired movement line.

8. A drilling method carried out using the drilling system comprising a support structure to be mounted on a surface to be drilled, a beam supported by the support structure, a tool holder supported by said beam, said tool holder having a locking orifice, and a drilling tool mounted on said tool holder for drilling in the direction of a drilling axis, wherein a mounting of the tool holder on the beam and a mounting of the drilling tool on the tool holder each comprise a sliding connection which permits sliding in a direction parallel to the drilling axis defined by said tool, wherein said drilling tool comprises a bearing mandrel intended to come into contact against the surface to be drilled, and an expandable ring closely fitting the bearing mandrel along a tapered contact surface and adapted so that a relative movement along a tapered contact surface central axis between the bearing mandrel and the ring procures an expansion of said ring capable of ensuring its locking in the locking orifice,
- the method comprising at least one step of drilling a hole, wherein, for each step of drilling a hole, a relative movement is applied between the expandable ring and the bearing mandrel,
- wherein the application of said relative movement between said expandable ring and said bearing mandrel is done so as to create a movement of the bearing mandrel against said surface to be drilled and through said locking orifice, over a distance $x2$ respecting the condition $x2 > 0.90 \cdot x$, where x corresponds to a total distance of the relative movement applied between the ring and the mandrel, and
- wherein the relative movement between the ring locked in the locking orifice and the bearing mandrel procures, by movement of the drilling tool relative to the tool holder via the slide connection, a movement of the bearing mandrel towards the surface to be drilled, through the locking orifice.

9. The drilling method according to claim 8, wherein the application of said relative movement between the expandable ring and the bearing mandrel is done so as to create, at the end of application, a bearing mandrel pressure, on said surface to be drilled, between about 600 and 1200 N.

* * * * *